United States Patent [19]

Tanigawa et al.

[11] Patent Number: 4,653,533
[45] Date of Patent: Mar. 31, 1987

[54] VARIABLE ORIFICE DEVICE

[75] Inventors: Naoya Tanigawa, Toyota; Toshiyuki Inagaki, Kariya; Hiroyuki Maeda, Toyota, all of Japan

[73] Assignee: Aisin Seiki Kabushiki Kaisha, Aichi, Japan

[21] Appl. No.: 801,813

[22] Filed: Nov. 26, 1985

[30] Foreign Application Priority Data

Nov. 27, 1984 [JP] Japan .......................... 59-180342[U]

[51] Int. Cl.⁴ ...................... F16D 25/14; F15D 1/02
[52] U.S. Cl. ........................ 137/565; 192/109 F; 138/46
[58] Field of Search .............. 137/565; 251/205, 206, 251/208; 138/45, 46; 192/109 F

[56] References Cited

U.S. PATENT DOCUMENTS

| | | | |
|---|---|---|---|
| 1,621,876 | 3/1927 | Doerr | 138/46 |
| 2,384,354 | 9/1945 | Talley | 138/46 |
| 3,562,782 | 2/1971 | Zychal | 138/46 |
| 4,132,302 | 1/1979 | Chatterjea | 192/109 F X |
| 4,422,536 | 12/1983 | Shatuck | 192/109 F X |
| 4,560,044 | 12/1985 | Nagata | 192/109 F X |

FOREIGN PATENT DOCUMENTS 2064727 6/1981 United Kingdom ................ 251/208

*Primary Examiner*—Alan Cohan
*Assistant Examiner*—John A. Rivell
*Attorney, Agent, or Firm*—Burns, Doane, Swecker & Mathis

[57] ABSTRACT

The present invention relates to a variable orifice device for modulating a clutch oil pressure of a power transmission. The device includes a body member having a pocket and a first and a second port. The pocket is open to one side of the body member with the first port connecting the pocket to an oil pump and the second port connecting the pocket to a modulator valve device. A plate member is arranged in the pocket and has a passage and a plurality of orifices. Each of the orifices has a different diameter. A selected one of the orifices communicates with the second port and the passage communicates with the first port. A cover member is arranged in the pocket and has a recess for connecting the passage to the selected one of the orifices.

12 Claims, 2 Drawing Figures

VARIABLE ORIFICE DEVICE

BACKGROUND OF THE INVENTION

1. Field of the Invention

This invention relates generally to a device for modulating a clutch pressure and more specifically to a variable orifice device for modulating the clutch pressure applied to a fluid pressure operated clutch of a power transmission of an industrial vehicle, for example, a fork lift.

2. Description of the Prior Art

In a conventional clutch pressure modulator valve device, the valve device comprises a piston disposed in an accumulator chamber for accumulating oil pressure for operating a clutch of a power transmission and a relief port for transmitting a portion of the pressurized oil in the accumulator chamber to an oil reservoir upon movement of the piston. In this way, the oil pressure operating clutch in the accumulator chamber increases along a gradual pressure gradient to a predetermined value. Subsequently, communication between the accumulator chamber and the relief port is cut off by further movement of the piston after the oil pressure in the accumulator chamber applied for operating the clutch is increased to the predetermined value. In this type of valve, however, the effective diameter of the orifice in the relief port for determining the pressure gradient of the modulating characteristic of the oil pressure is fixed and cannot be controlled from the exterior of the power transmission.

It is desirable that the modulating characteristic of the pressure gradient of the modulator valve changes in response to an operating condition or load condition of the vehicle in order to operate the clutch under an optimum pressure gradient by changing any one of several operating parameters. For example, a spring force biasing the piston, the volume of the accumulator chamber or the flow rate of oil into the accumulator chamber may be changed. As a result of this change, a shock can be generated due to the sudden engagement of the clutch when the vehicle is under a light load due to a very steep pressure gradient of the modulating characteristic or an increase in time lag of clutch operation can occur when the vehicle is under a heavy load due to a very gradual pressure gradient of the modulating characteristic.

OBJECTS AND SUMMARY OF THE PRESENT INVENTION

It is an object of the present invention to avoid the aforementioned and other disadvantages of a conventional clutch pressure modulator valve device.

More particularly, it is an object of the present invention to provide a variable orifice device that permits selection of the modulating characteristic in response to an operating condition or the load condition of a vehicle.

Another object of the present invention is to provide a device which allows relatively easy adjustment of the modulating characteristic from the exterior of the power transmission.

These and other objects are accomplished by connecting a variable orifice device according to the present invention between an oil pump and a clutch pressure modulator valve. The variable orifice device of the present invention includes a body member having a pocket and a first and a second port. The pocket is open to one side of the body member, with the first port connecting the pocket to an oil pump and the second port connecting the pocket to a modulator valve device. A plate member is arranged in the pocket and has a passage and a plurality of orifices. Each of the orifices has a different diameter. A selected one of the orifices is connected with the second port and the passage is connected with the first port. A cover member is arranged in the pocket and has a recess for connecting the passage to the orifices.

Consequently, with the present invention, when the vehicle is under a heavy load, for example, the time lag of clutch operation is decreased to the minimum value without causing a shock to occur upon clutch engagement due to the existence of a steep pressure gradient due to the selection of a larger diameter orifice for operating the device. Moreover, when the vehicle is under a light load the clutch is prevented from generating a shock upon being engaged due to the gradual pressure gradient occasioned by selecting one of the smaller diameter orifices.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
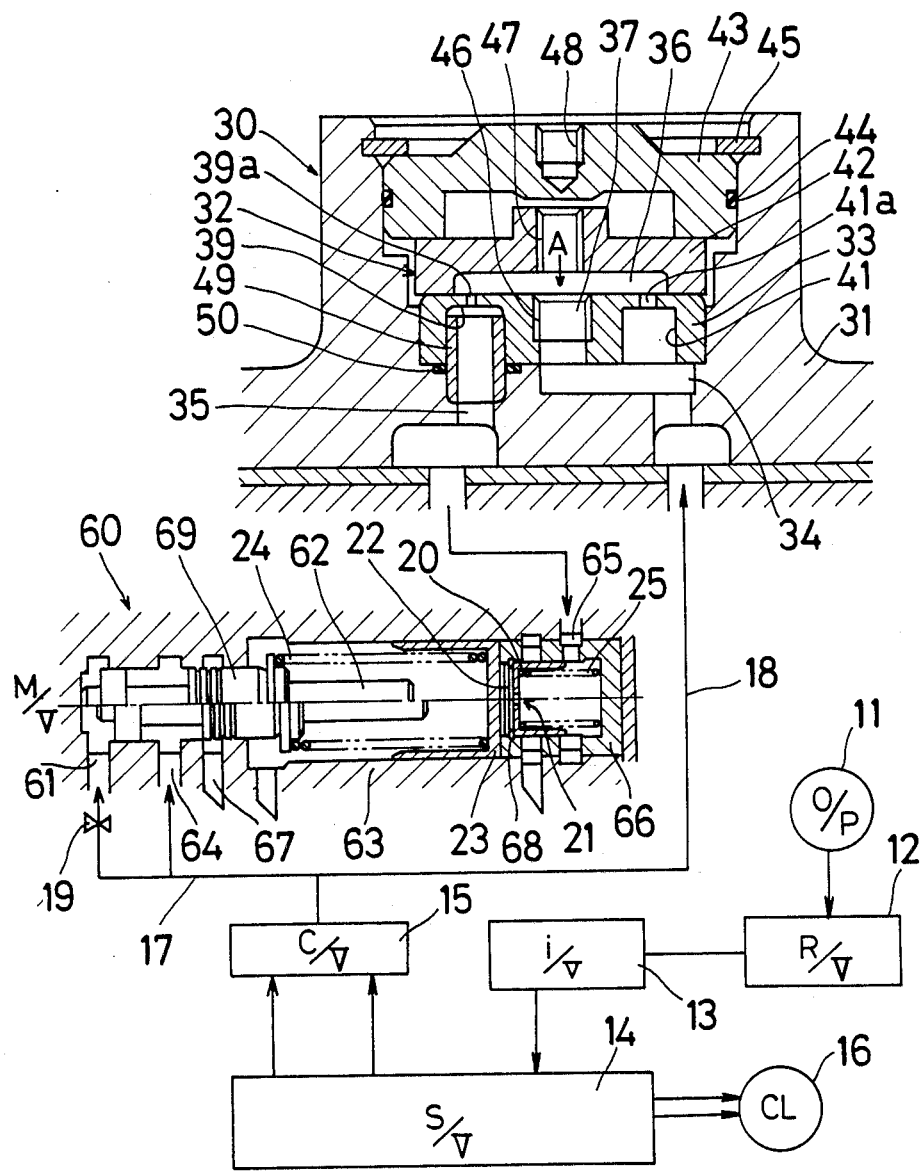
FIG. 1 is a cross-sectional view of a variable orifice device according to the present invention which is arranged in a schematic diagram of an oil pressure circuit of a fork lift.

With reference to FIG. 1, a clutch pressure modulator valve device 60 comprises a cylinder 63 having an accumulator chamber 22 defined by a first piston 20 disposed in the cylinder 63. A second piston 23 is slidably fitted in the cylinder 63 opposite to the first piston 20. The diameter of the first piston 20 is smaller than the diameter of the second piston 23. The first piston 20 is slidably fitted within a core 66 which is in turn fixed within the cylinder 63. The first piston 20 is biased in the direction of the second piston 23 by a spring 25 disposed between one end of the first piston 20 and the core 66 and is limited in the working stroke thereof by a snap ring 68 fixed to the core 66. An orifice 21 for transmitting oil from the core 66 into the accumulator chamber 22 is formed on a crown portion of the first piston 20.

The second piston 23 is biased in the direction of the first piston 20 by a spring 24 disposed between one end of the first piston 20 and a spool 69 slidably fitted in the cylinder 63 and is limited in the working stroke thereof by an end surface of the core 66. The return stroke of the second piston 23 is limited by an end portion of a rod 62 which extends in the direction of the second piston 23 from the spool 69. A port 61 creates a back pressure between the cylinder 63 and the spool 69 through an orifice 19 in a passage 17. A port 65 is provided for transmitting oil into the core 66 from an oil pump 11 while a port 64 is provided for creating back pressure to the spool 69.

In passages between the oil pump 11 and the modulator valve device 60, as in a conventional oil pressure circuit, a regulator valve device 12, an inching valve device 13, a selector valve device 14, a check valve device 15 and a clutch device 16 are interposed.

Figure 2:
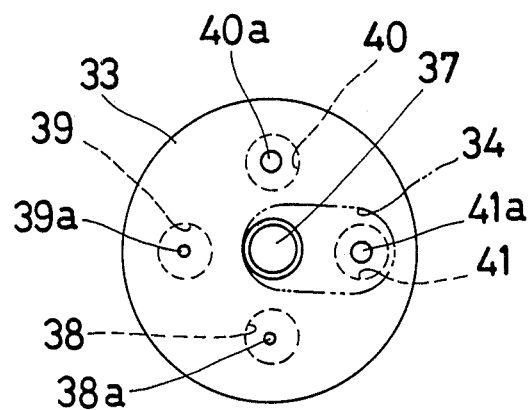
FIG. 2 is a partial view of the variable orifice device taken along the arrow A in FIG. 1.

A variable orifice device 30 is interposed into a passage 18 between the check valve device 15 and the port 65 of the modulator valve device 60. The device 30 comprises a body 31 having a pocket 32 with a first port 34 and a second port 35 connected thereto. The first port 34 is connected with the check valve device 15 via the passage 18, and the second port 35 is connected with the port 65 of the modulator valve device 60. In the pocket 32, there is a disc type plate 33 having a central passage 37 and a plurality of orifices 38a, 39a, 40a and 41a on a circumference around the passage 37 all extending in a common direction therethrough (as is clearly shown in FIG. 2).

The diameter of the orifice 38a is the smallest and the diameter of the orifice 41a is the largest. The orifice 39a is larger than the orifice 38a, and the orifice 40a is larger than the orifice 39a. Each orifice has a respective pocket 38, 39, 40 or 41 arranged within the disc type plate 33.

An annular cylindrical pin 49 is disposed in the pocket 39 and the second port 35 and locks the pocket 39 and the second port 35 for preventing relative rotational movement between the body 31 and the disc type plate 33. In this way, the preselected diameter orifice is retained in the fluid path through the device.

A cover member disposed into the pocket 32 comprises an under cover 42, an upper cover 43 and a snap ring 45. The under cover 42 has a recess 36 for connecting with the orifice arranged over the port 35 (in the illustrated position, orifice 39a) and the passage 37. The snap ring 45 secures the upper and under covers 42, 43 into the pocket 32 for preventing unwanted removal thereof. Rubber rings 44, 50 prevent the oil from leaking out of the device 30. Screw portions or the like 46, 47, 48 are arranged at the plate 33 and the covers 42, 43 for facilitating removal of these parts from the pocket 32 to permit selection of a predetermined one of the orifices.

When the selector valve 14 is in a neutral position, communication with port 65 through the check valve device 15 is cut off. When the selector valve is shifted to a forward position, the operating oil is introduced into a forward clutch of the clutch device 16. The operating oil then acts on the second piston 23 via the port 65 and the orifice 21 of the first piston 20. The first piston 20 which is biased by the spring 25 does not move until the operating oil pressure overcomes the initial load of the spring 25. During this situation, the operating oil pressure is introduced into the forward clutch and rapidly increases to a predetermined value. The operating oil further acts on the upstream end of the spool 69 via the orifice 19, whereby the spool 69 moves in the direction of the second piston 23. When excess pressure is created at the upstream end of the spool 69, the result is that the operating oil is drained through the port 67.

When the pressure of the operating oil overcomes the initial load of the spring 24, the second piston 23 moves in a leftward direction as seen in FIG. 1. When the second piston 23 moves to the position contacting the rod 62, the pressure gradient of the operating oil changes from a gradual characteristic to a steep characteristic. Then the clutch device 16 is engaged.

The pressurized oil passes in the variable orifice device 30 via the passage 18. When the vehicle has the lightest duty, the smallest diameter orifice 38a is selected, and set between the recess 36 and the second port 35. When an increased duty is needed, the slightly larger diameter orifice 39a is selected.

Upon heavier duty, the still larger diameter orifice 40a is selected, and at the heaviest duty, the largest diameter orifice 41a is selected. Therefore, under heavy duty load, a smaller time lag occurs until the oil pressure is modulated to the predetermined value.

Obviously many modifications and variations of the invention are possible in light of the above teachings. It is therefore to be understood that within the scope of the appended claims, the invention may be practiced otherwise than as specifically described herein.

What is claimed is:

1. A variable orifice device for modulating a clutch oil pressure of a power transmission, comprising:
    a body member having a pocket, a first and a second port communicating with the pocket;
    said pocket being open to one side of said body member;
    said first port connecting said pocket to an oil pump;
    said second port connecting said pocket to a modulator valve device;
    a plate member interposed in said pocket, said plate member having a passage and a plurality of orifices;
    each of said orifices having a different diameter;
    a selected one of said orifices communicating with said second port;
    said passage communicating with said first port; and
    a cover member arranged in said pocket and having a recess for connecting said passage to said selected one of said orifices.

2. The variable orifice device according to claim 1, wherein:
    said plate member is in the form of a disc;
    said passage being positioned at a center of said plate member; and
    said orifices being spaced along a circumference around said passage.

3. The variable orifice device according to claim 1, further comprising:
    a pin;
    said pin being in the form of an annular cylinder and being adapted to lock one of said orifices with respect to said second port.

4. The variable orifice device according to claim 2, further comprising:
    a pin;
    said pin being in the form of an annular cylinder and being adapted to lock one of said orifices with respect to said second port.

5. The variable orifice device according to claim 2, wherein:
    said plate member includes a screw portion for facilitating removal of the plate member from the pocket; and
    said screw portion being concentrically arranged within said passage.

6. The variable orifice device according to claim 5, wherein said cover member has a screw portion for facilitating removal of the cover member.

7. The variable orifice device according to claim 1, further comprising a lock member for connecting said cover member to said body member.

8. The variable orifice device according to claim 7, wherein said lock member is a snap ring.

9. The variable orifice device according to claim 4, wherein:
said plate member has a screw portion for facilitating removal of the plate member from the pocket; and
said screw portion being concentrically arranged within said passage.

10. The variable orifice device according to claim 9, wherein said cover member has a screw portion for facilitating removal of the cover member.

11. The variable orifice device according to claim 4, further comprising a lock member for connecting said cover member to said body member.

12. The variable orifice device according to claim 11, wherein said lock member is a snap ring.

* * * * *